Sept. 2, 1952            C. A. ELLIS            2,608,687
EYE PROTECTION DEVICE
Filed Jan. 2, 1948
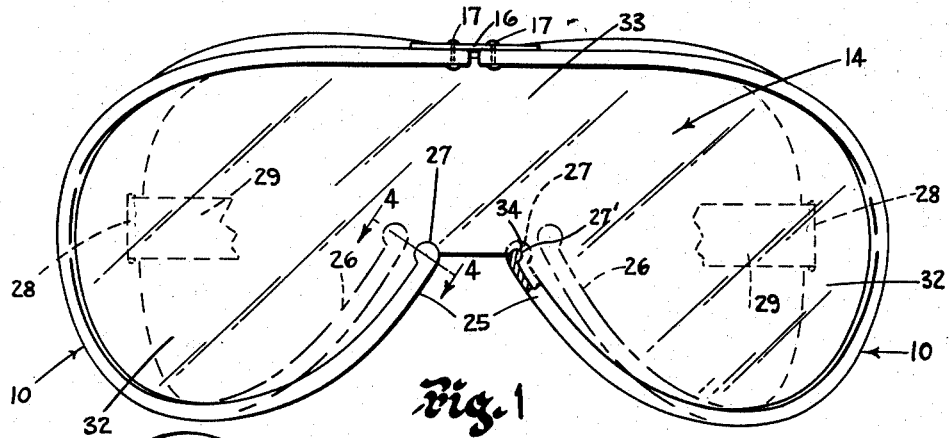
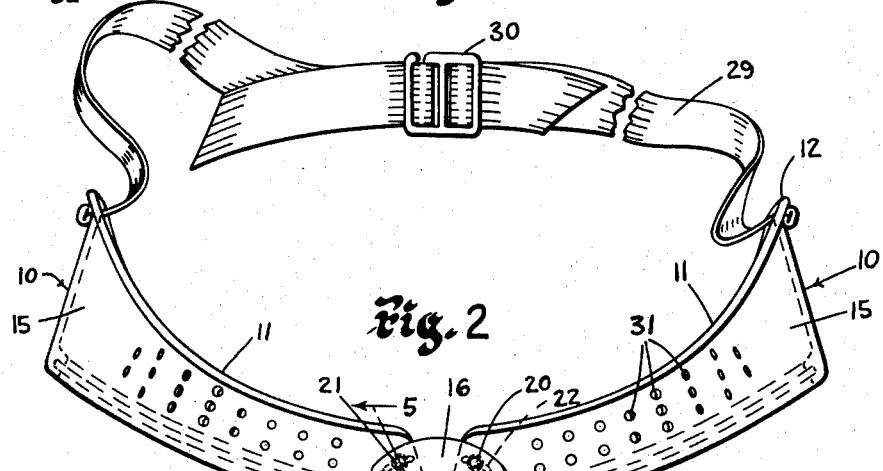
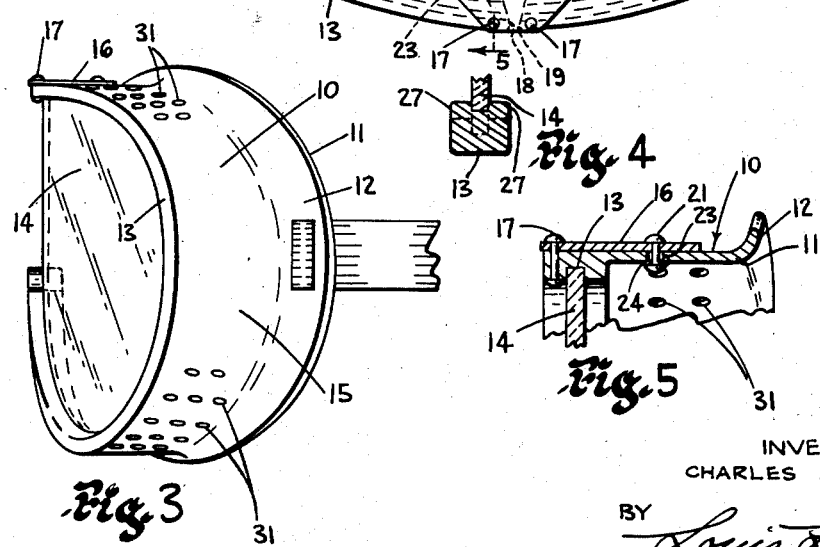
INVENTOR
CHARLES A. ELLIS
BY
Louis L. Gagnon
ATTORNEY Patented Sept. 2, 1952

2,608,687

UNITED STATES PATENT OFFICE 2,608,687

EYE PROTECTION DEVICE

Charles A. Ellis, Southbridge, Mass., assignor to American Optical Company, Southbridge, Mass., a voluntary association of Massachusetts Application January 2, 1948, Serial No. 107

3 Claims. (Cl. 2—14)

This invention relates to improvements in eye protection devices or goggles which are adapted to fit the contour of the face about the eyes and in particular to goggles having portions which are self adjusting to the particular contour requirements of different individuals and method of making the same.

One of the principal objects of the invention is to provide a single aperture type goggle employing two eyecup portions adjustable relative to each other and a single sheet like lens member supported within the eyecups in such a manner that there will be an unobstructed field of vision and when the eyecups are adjusted to different angular positions the sheet like lens member will readily conform therewith.

Another important object of the invention is to provide a single aperture type eye protection device having two eyecup portions pivotally connected with each other and self adjusting to fit the general facial characteristics of different individuals.

Another object is to provide an eye protection device of the above nature having a nasal recess in the lower portion thereof and having its upper and lower walls provided with a plurality of ventilation openings.

Another object is to provide an eye protection device of the above character formed of relatively light weight nonmetallic material having two major cup portions pivotally connected with each other and formed with face contacting edge portions shaped to the general contour of the face and having forwardly extending integrally related side wall portions provided with lens receiving grooves and having a single lens member shaped substantially to the contour shape of the cup portions and seated within the lens receiving grooves with said lens being formed of a resilient material which will allow it to assume different curves as the cup portions are adjusted to fit the face of the wearer.

Another object is to provide an eye protection device of the above character having two pivotally connected eyecup portions so formed and related with each other as to produce a single aperture goggle surrounding the eyes with clearance for affording free ventilation transversely of the nose.

Another object is to provide an eye protection device of the above character which may be worn over prescription mountings and lenses and which will afford protection means for said mountings and lenses as well as for the eyes of the individual.

Another object is to provide an eye protection device of the above character which is simple in construction, inexpensive to manufacture and which is light in weight and comfortable in use and which will afford maximum protection.

Other objects and advantages of the invention will become apparent from the following description taken in connection with the accompanying drawings and it will be apparent that many changes may be made in the details of construction, arrangement of parts and methods shown and described without departing from the spirit of the invention as expressed in accompanying claims. The invention, therefore, is not limited to the exact details of construction and arrangement of parts shown and described as the preferred form only has been shown by way of illustration.

Referring to the drawings:

Fig. 1 is a front elevational view of the device embodying the invention;

Fig. 2 is a top plan view of the device shown in Fig. 1;

Fig. 3 is a side elevational view of the device;

Fig. 4 is a fragmentary sectional view as taken on line 4—4 of Fig. 1; and

Fig. 5 is an enlarged fragmentary sectional view as taken on line 5—5 of Fig. 2.

Single aperture goggles are not new in the art as several different types have been manufactured and sold. Most of the prior art structures embodied a single unitary cup supporting a single shield type lens and were of a rigid non-adjustable nature requiring several different sizes to fit the various type individuals. With eye protection devices of this nature it will be seen that no adjustments were possible and that great difficulty was encountered in securing a proper fit which would be comfortable to the wearer. Other prior structures embodied a pair of eyecups with separate lenses and connected by a bridge member, and while they overcame the fitting difficulties, they presented other problems such as ventilation and visibility due to their close fit about the eyes at the nasal sides of the cups which would prevent cross ventilation and would present a barrier in the desired focal field.

The goggle of the present invention may also be fitted over corrective spectacles worn by the individual. The face contacting edge is provided with an outwardly rolled portion to afford a comfortable engagement with the face and the device is so designed that it will not rest upon the nose thereby avoiding injury thereto when the goggle is subjected to a blow or the like.

While overcoming the above difficulties with a device of this nature, the device is extremely light in weight, inexpensive to manufacture and will be comfortable to wear.

Referring more particularly to the drawings wherein like characters of reference designate like parts throughout the several views, the device embodying the invention comprises a pair of cup members 10 each having a face engaging edge portion 11 formed with an integral outwardly curving lip 12 for engaging the face of the wearer. The face contacting edge 11 is carefully controlled as to size and shape so that it will fit the general facial characteristics of most individuals.

The main eyecup members are formed of nonmetallic material, preferably transparent, plastic material such as cellulose nitrate, cellulose acetate, methyl methacrylate or other known artificial resins and each eyecup is provided with a grooved portion 13, on the side opposed to the face contacting edge 12, adapted to receive the contour edge of the lens 14.

The eyecup members are provided with integral walls 15 which extend throughout the tops, sides and bottoms thereof and extend upwardly intermediate the lower portions to form a nasal recess with the said eyecups being spaced from each other at the top of the said recess. The upper nasal portions of the eyecups are hingedly connected to a plate like member 16, by the rivets 17, with the adjacent ends 18 and 19 of the eyecups in spaced relation with each other. The rivets 17 act as pivots about which the eyecups may be swung to adjust them to the contour of the face of the wearer.

The eyecups 10 are limited in their adjustability by means of the pins or rivets 20 and 21, which extend from the plate 16 through arcuate slots 22 and 23 formed in the eyecups. Washers 24 are positioned between the head of the pin or rivet and the inside of the eyecup to provide smoother action when the eyecups are being adjusted to fit the face.

The lower nasal end portions 25 of the eyecups are adapted to lie in spaced relation with the upper nasal ends and with each other. The end portions 25 are formed to a predetermined contour shape as indicated by the dot and dash lines 26 in Fig. 1 and are of a different radius than the adjacent edge of the lens which is adapted to be fitted therein. When the lens is assembled with the eyecups the end portions 25 are sprung outwardly to receive the lens within the slot 13 and through the inherent resilient characteristics of the material, will apply a gripping action on the said lens. To further secure and hold the lens within the eyecups the end portions 25 are provided with enlarged spaced end portions 27 having side surface contact with the front and rear surfaces of the lens and with an intermediate latch portion 27' adapted to be snapped within and to interlock with spaced recesses 34 formed in the lower edge of the lens.

The eyecups 10 are each provided with an opening 28 at their temporal sides, through which there is attached a resilient headband 29. The headband 29 is provided with a member 30 for adjusting the length thereof to fit different individuals. When the goggles are positioned on the face of a wearer it will be seen that the face contacting edges 12 will be firmly held in proper fitted position by the resiliency of the head band.

The eyecup members 10 are provided with a plurality of ventilation openings 31 in the upper and lower walls thereof to allow air to enter the interior of said eyecups.

The lens 14 is formed from a single sheet of transparent plastic material and has a pair of peripheral shaped end portions 32 and an intermediate narrower connecting portion 33. When assembling the lens 14 with the eyecups 10 the upper edge of the lens is first seated within the grooves 13 in the upper portion of the eyecups, then the end portion 25 of the eyecups are sprung outwardly to allow the outer and lower portions of the lens to become seated within the remaining lens grooves, then the end portions are released, thereby clamping the lens securely within the said eyecups with the latch portions 27' in latched relation with the recesses 34. The lens material is such that when the eyecups are pivoted about the pins 17, to fit against the face of the wearer, that the lens will readily bend to conform to the same curve.

In forming the goggle, the eyecup portions may be injection moulded to the desired shape or they may be shaped from sheet stock material under the action of heat and compression between suitable forming dies. The lenses may be initially formed with a slight curve, by means of dies or the like, to more readily fit within the eyecups.

From the foregoing description, it will be seen that simple, efficient and economical means and methods have been provided for accomplishing all the objects and advantages of the invention.

Having described my invention, I claim:

1. An eye protection device of the character described comprising a unitary flexible transparent plastic lens having a pair of peripherally curved end portions and an integrally formed narrower connecting portion therebetween, a pair of substantially semi-circular eyecups each having a rear edge shaped to the general contour of the face and having a forwardly disposed grooved portion for receiving the lens, with the curvature of the eyecups being less than the curvature of the shaped end portions of the lens, the upper and lower end of each of said eyecups being nasally disposed and in spaced relation with the adjacent end of the other eyecup, a plate member overlying a portion of the upper nasal ends of the eyecups with the said eyecups being pivotally connected thereto for movement about a substantially vertically disposed axis whereby the eyecups may be tilted relative to each other to accommodate the rear edge thereof to the wearer's face, and means associated with the plate member and the eyecups for limiting the extent of the tilting thereof.

2. An eye protection device of the character described comprising a transparent flexible shield embodying a pair of eye portions joined by an intermediate nasal portion formed integrally therewith, and a pair of divided eyecups each having a portion to receive the adjacent outer edge of said eye portions of the shield, with the upper and lower ends of each eyecup being disposed adjacent said intermediate portion of the shield and spaced from the adjacent ends of the other eyecup to permit a flexing of said intermediate portion of the shield intermediate said spaced ends of the eyecups to readily accommodate the device to the curvature of the face of the wearer.

3. An eye protection device of the character described comprising a transparent flexible shield embodying a pair of eye portions joined by an intermediate nasal portion formed integrally therewith, and a pair of divided eyecups each having a portion to receive the adjacent outer edge of the eye portions of the shield, with the upper and lower ends of each eyecup being disposed adjacent said intermediate portion of the shield and spaced from the adjacent ends of the other eyecup, and a plate-like member overlying the upper spaced ends of said eyecups, and means for pivotally connecting said upper ends of the eyecups to said plate-like member for movement about an axis disposed substantially normal to the plate-like member, said intermediate portion of the shield being free to flex with said pivotal movement of the eyecups whereby the device may be accommodated to the general curvature of the face of the wearer.

CHARLES A. ELLIS.

REFERENCES CITED

The following references are of record in the file of this patent:

UNITED STATES PATENTS

| Number | Name | Date |
|---|---|---|
| 1,769,606 | Queen | July 1, 1930 |
| 2,174,768 | Turkel | Oct. 3, 1939 |
| 2,192,092 | Miller | Feb. 27, 1940 |
| 2,368,750 | DuBois | Feb. 6, 1945 |
| 2,406,998 | DuBois | Sept. 3, 1946 |
| 2,422,534 | DuBois | June 17, 1947 |
| 2,446,048 | Kimball | July 27, 1948 |

FOREIGN PATENTS

| Number | Country | Date |
|---|---|---|
| 359,601 | France | Mar. 31, 1906 |